(12) United States Patent
Bifulco et al.

(10) Patent No.: US 11,927,106 B2
(45) Date of Patent: Mar. 12, 2024

(54) FRAME CONNECTION BETWEEN FAN CASE AND CORE HOUSING IN A GAS TURBINE ENGINE

(71) Applicant: Raytheon Technologies Corporation, Farmington, CT (US)

(72) Inventors: Anthony R. Bifulco, Ellington, CT (US); David A. Topol, West Hartford, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/088,196

(22) Filed: Dec. 23, 2022

(65) Prior Publication Data

US 2023/0127925 A1 Apr. 27, 2023

Related U.S. Application Data

(63) Continuation of application No. 17/407,275, filed on Aug. 20, 2021, now Pat. No. 11,555,420.

(51) Int. Cl.
*F01D 25/28* (2006.01)
*F01D 9/06* (2006.01)
*F01D 25/24* (2006.01)

(52) U.S. Cl.
CPC .............. *F01D 25/28* (2013.01); *F01D 9/06* (2013.01); *F01D 25/24* (2013.01);
(Continued)

(58) Field of Classification Search
CPC . F01D 25/28; F01D 25/24; F01D 9/06; F05D 2260/96; F05D 2260/606; F05D 2260/35; F05D 2250/191; F05D 2240/14
See application file for complete search history.

(56) References Cited

U.S. PATENT DOCUMENTS

| 3,398,535 A | 8/1968 | Campbell et al. |
| 3,421,577 A * | 1/1969 | Valyi .................... B21D 53/045 |
| | | 165/170 |

(Continued)

FOREIGN PATENT DOCUMENTS

| EP | 3009618 A1 | 4/2016 |
| FR | 3062876 B1 | 8/2018 |

OTHER PUBLICATIONS

European Search Report for EP Application No. 22191557.2 dated Jan. 24, 2023.

(Continued)

*Primary Examiner* — Igor Kershteyn
(74) *Attorney, Agent, or Firm* — Carlson, Gaskey & Olds, P.C.

(57) ABSTRACT

A gear reduction reduces a speed of a fan rotor relative to a speed of a fan drive turbine. A fan case surrounds the fan rotor. A core engine has a compressor section and includes a low pressure compressor. The fan rotor delivers air into a bypass duct defined between the fan case and the core engine. A rigid connection between the fan case and the core engine includes a plurality of aft connecting members rigidly connected to the fan case, and to the core engine. A plurality of fan exit guide vanes are rigidly connected to the fan case, with the fan exit guide vanes including structural fan exit guide vanes which are rigidly connected to the core engine, and non-structural fan exit guide vanes, and the non-structural fan exit guide vanes being provided with an acoustic feature to reduce noise.

20 Claims, 5 Drawing Sheets

(52) U.S. Cl.
CPC .... *F05D 2240/14* (2013.01); *F05D 2250/191* (2013.01); *F05D 2260/30* (2013.01); *F05D 2260/606* (2013.01); *F05D 2260/96* (2013.01)

(56) References Cited

U.S. PATENT DOCUMENTS

| | | | | |
|---|---|---|---|---|
| 3,820,628 | A | * | 6/1974 | Hanson .................. F02K 1/827 181/220 |
| 5,409,184 | A | | 4/1995 | Udall et al. |
| 5,740,674 | A | | 4/1998 | Beutin et al. |
| 7,654,075 | B2 | | 2/2010 | Udall |
| 7,845,158 | B2 | | 12/2010 | Udall |
| 8,911,203 | B2 | | 12/2014 | Reinhardt et al. |
| 8,979,491 | B2 | | 3/2015 | Heyerman et al. |
| 9,032,740 | B2 | | 5/2015 | Journade et al. |
| 9,784,129 | B2 | | 10/2017 | Eleftheriou et al. |
| 10,190,501 | B2 | | 1/2019 | Bagnall |
| 2004/0108413 | A1 | | 6/2004 | Thompson |
| 2005/0135924 | A1 | * | 6/2005 | Prasad ..................... F01D 5/16 415/115 |
| 2008/0295518 | A1 | * | 12/2008 | Reba ........................ F02C 7/24 60/725 |
| 2013/0014515 | A1 | | 1/2013 | Bellabal et al. |
| 2013/0084174 | A1 | | 4/2013 | Maalouf et al. |
| 2013/0195610 | A1 | * | 8/2013 | Rose ...................... F01D 5/145 415/115 |
| 2013/0287562 | A1 | | 10/2013 | Ishigure et al. |
| 2015/0052908 | A1 | | 2/2015 | Todorovic |
| 2016/0327064 | A1 | | 11/2016 | Logue et al. |
| 2016/0363047 | A1 | | 12/2016 | Schwarz et al. |
| 2017/0084218 | A1 | | 3/2017 | Choi et al. |
| 2018/0030926 | A1 | * | 2/2018 | Eckett ...................... F02C 3/04 |
| 2020/0003122 | A1 | | 1/2020 | Wilshaw |
| 2020/0088136 | A1 | * | 3/2020 | Soria ....................... F02C 7/045 |
| 2022/0049621 | A1 | * | 2/2022 | Sawyers-Abbott ... F01D 25/162 |

OTHER PUBLICATIONS

European Search Report for EP Application No. 22191560.6 dated Dec. 23, 2022.

* cited by examiner

FRAME CONNECTION BETWEEN FAN CASE AND CORE HOUSING IN A GAS TURBINE ENGINE

CROSS-REFERENCE TO RELATED APPLICATIONS

This application is a continuation of U.S. patent application Ser. No. 17/407,275 filed Aug. 20, 2021.

BACKGROUND OF THE INVENTION

This application relates to incorporating frame connections and fan exit guide vanes connections between a fan case and a core housing in a gas turbine engine.

Gas turbine engines are known, and typically include a fan delivering air into a bypass duct as propulsion air, and into a core engine housing. The core engine housing houses a compressor section. The air is compressed and delivered into a combustor where it is mixed with fuel and ignited. Products of this combustion pass downstream over turbine rotors, driving them to rotate. The turbine rotors in turn rotate the fan and compressor rotors.

Historically the fan rotor was fixed to rotate at the same speed as a fan drive turbine rotor, which may also drive a low pressure compressor rotor. More recently a gear reduction has been incorporated between the fan drive turbine and the fan rotor, allowing the fan rotor to rotate at slower speeds than the fan drive turbine.

In modern gas turbine engines with such a gear reduction the fan case has been fixed to the core housing through a plurality of fan exit guide vanes, which provide the structural support between the fan case and the inner core housing.

SUMMARY OF THE INVENTION

In a featured embodiment, a gas turbine engine includes a fan rotor driven by a fan drive turbine about an axis through a gear reduction to reduce a speed of the fan rotor relative to a speed of the fan drive turbine. A fan case surrounds the fan rotor. A core engine has a compressor section and includes a low pressure compressor. The fan rotor delivers air into a bypass duct defined between the fan case and the core engine. A rigid connection between the fan case and the core engine includes a plurality of aft connecting members rigidly connected to the fan case, and to the core engine. A plurality of fan exit guide vanes are rigidly connected to the fan case, with the fan exit guide vanes including structural fan exit guide vanes which are rigidly connected to the core engine, and non-structural fan exit guide vanes, and the non-structural fan exit guide vanes being provided with an acoustic feature to reduce noise.

In another embodiment according to the previous embodiment, the acoustic feature includes the non-structural fan exit guide vanes are formed with chambers and a covering perforated face sheet.

In another embodiment according to any of the previous embodiments, the structural fan exit guide vanes include 0-55% of a total number of fan exit guide vanes including the non-structural fan exit guide vane.

In another embodiment according to any of the previous embodiments, the structural fan exit guide vanes include 15-30% of the total fan exit guide vanes.

In another embodiment according to any of the previous embodiments, the low pressure compressor has four to six stages.

In another embodiment according to any of the previous embodiments, the aft connecting members are A-frames connecting the fan case to the core engine.

In another embodiment according to any of the previous embodiments, the structural fan exit guide vanes extend at a first angle from a radially inner end to a radially outer end. The first angle has a radially outward component and an axially aft component. The A-frame legs extend from a radially inner connection to the core engine to a connection point with the fan case at a second angle having a component in a radially outward direction, and in an axially forward direction.

In another embodiment according to any of the previous embodiments, the core engine includes a fan intermediate case forward of the low pressure compressor, and the structural fan guide vanes are rigidly connected to the fan intermediate case.

In another embodiment according to any of the previous embodiments, the core engine includes a compressor intermediate case intermediate the low pressure compressor and a high pressure compressor, and the aft connecting members rigidly secured to the compressor intermediate case.

In another embodiment according to any of the previous embodiments, the non-structural fan exit guide vanes also are connected to the fan intermediate case, but being allowed to float in a radial direction.

In another featured embodiment, a gas turbine engine includes a fan rotor driven by a fan drive turbine about an axis through a gear reduction to reduce a speed of the fan rotor relative to a speed of the fan drive turbine. A fan case surrounds the fan rotor. A core engine has a compressor section, including a low pressure compressor. The fan rotor delivers air into a bypass duct defined between the fan case and the core engine. A rigid connection between the fan case and core engine includes a plurality of A-frames each including a pair of legs rigidly connected at a connection point to the fan case. Each leg in the pair extend away from the connection point in opposed circumferential directions to be connected to the core engine to form an A-shape. A plurality of fan exit guide vanes are rigidly connected to the fan case, with the fan exit guide vanes including structural fan exit guide vanes which are rigidly connected to the core engine, and non-structural fan exit guide vanes, and the non-structural fan exit guide vanes being provided with an acoustic feature to reduce noise.

In another embodiment according to any of the previous embodiments, the acoustic feature includes the non-structural fan exit guide vanes are formed with chambers and a covering perforated face sheet.

In another embodiment according to any of the previous embodiments, the structural fan exit guide vanes include 0-55% of a total number of fan exit guide vanes including the non-structural fan exit guide vane.

In another embodiment according to any of the previous embodiments, the structural fan exit guide vanes include 15-55% of the total fan exit guide vanes.

In another embodiment according to any of the previous embodiments, the structural fan exit guide vanes include 15-30% of the total fan exit guide vanes.

In another embodiment according to any of the previous embodiments, the low pressure compressor has four to six stages.

In another embodiment according to any of the previous embodiments, there are four of the A-frames connecting the fan case to the core engine.

In another embodiment according to any of the previous embodiments, the structural fan exit guide vanes extend at a first angle from a radially inner end to a radially outer end. The first angle has a radially outward component and an axially aft component. The A-frame legs extend from a radially inner connection to the core engine to the connection point with the fan case at a second angle having a component in a radially outward direction, and in an axially forward direction.

In another embodiment according to any of the previous embodiments, the core engine includes a fan intermediate case forward of the low pressure compressor, and the structural fan guide vanes are rigidly connected to the fan intermediate case.

In another embodiment according to any of the previous embodiments, the core engine includes a compressor intermediate case intermediate the low pressure compressor and a high pressure compressor. The A-frames are rigidly secured to the compressor intermediate housing.

The present disclosure may include any one or more of the individual features disclosed above and/or below alone or in any combination thereof.

These and other features of the present invention can be best understood from the following specification and drawings, the following of which is a brief description.

DETAILED DESCRIPTION

Figure 1:
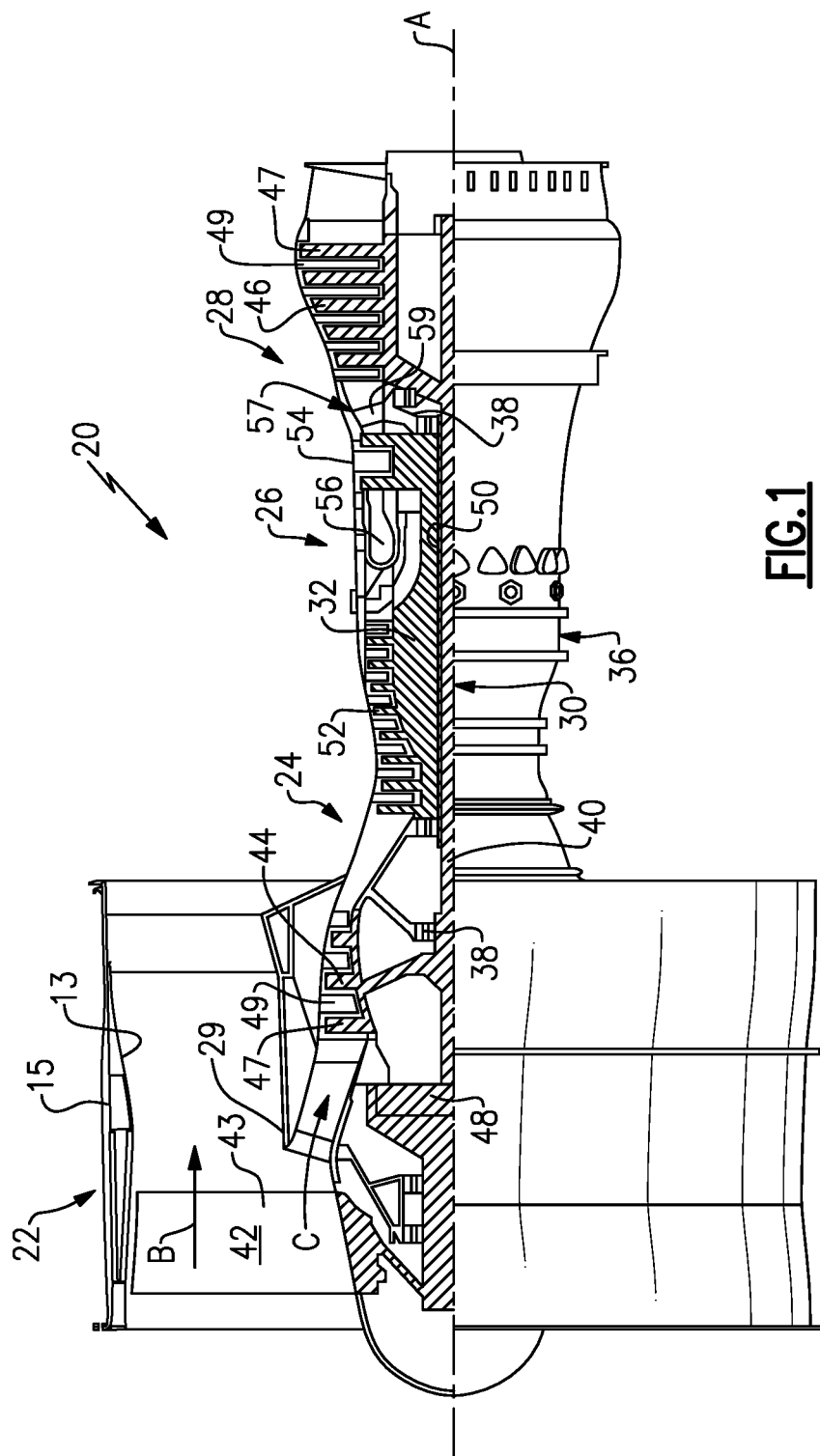
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 38 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(\text{Tram}\ °\text{R})/(518.7°\text{R})]^{0.5}$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a product of the pressure ratio of the low pressure compressor 44 and the fan pressure ratio is between 3.0 and 6.0, or more narrowly is between 4.0 and 5.5. The pressure ratio of the high pressure compressor ratio 52 is measured as the pressure at the exit of the high pressure compressor 52 divided by the pressure at the inlet of the high pressure compressor 52. In examples, the pressure ratio of the high pressure compressor 52 is between 7.0 and 12.0, or more narrowly is between 10.0 and 11.5. The OPR can be equal to or greater than 44.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees Fahrenheit (° F.). The TET may be greater than or equal to 2700.0° F., or more narrowly less than or equal to 3500.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated to at the trailing edges of the axially aftmost row of airfoils of the turbine section 28 at the MTO condition. The EGT may be less than or equal to 1000.0° F., or more narrowly greater than or equal to 800.0° F., such as between 900.0° F. and 975.0° F. The relatively low EGT can be utilized in combination with the other techniques disclosed herein to reduce fuel consumption.

Figure 2A:
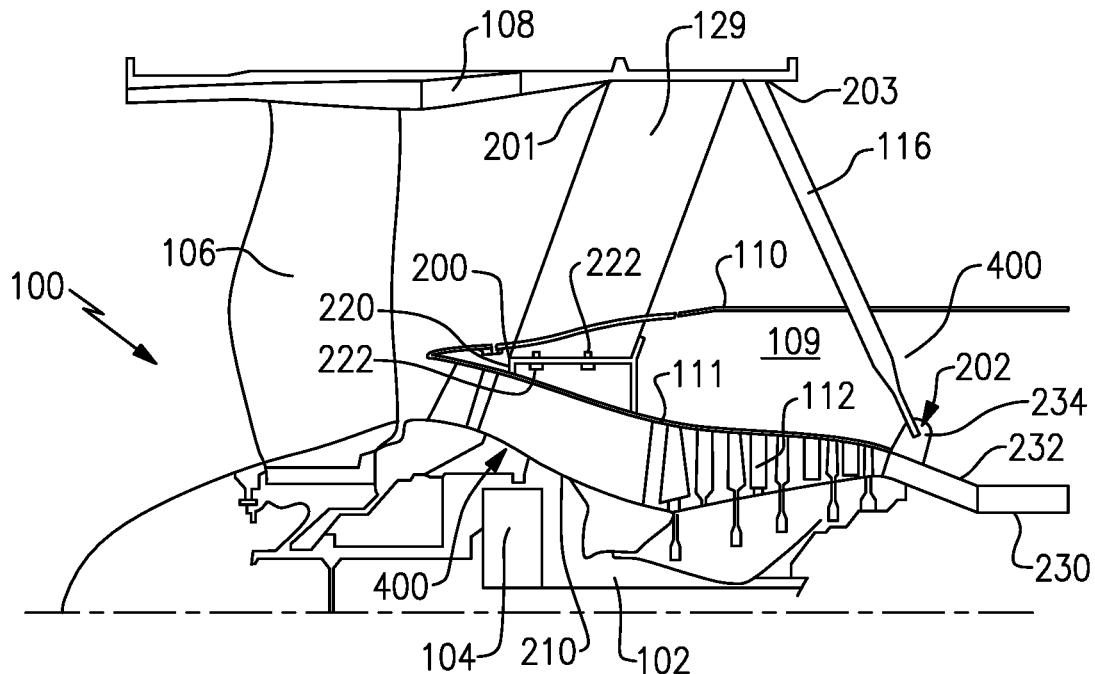
FIG. 2A schematically shows details of the connection between a fan case and an inner core housing.

FIG. 2A shows an engine 100, which may be similar to the engine 20 of FIG. 1. A shaft 102 is driven by a fan drive turbine to drive a fan rotor 106 through a gear reduction 104. The drive connection here may be generally as described above with regard to FIG. 1. A fan case 108 surrounds the fan rotor 106, and an core engine 400 may include a splitter wall 110 that surrounds compressor housing wall 111 which houses a low pressure compressor 112, and a high pressure compressor 230, and combustor and turbine sections (not shown in this Figure). The core engine 400 must be rigidly connected to the fan case 108, to address torque and other loads.

Applicant has previously developed a geared gas turbine engine. In this first generation engine the fan case was connected to the core engine through a plurality of fan exit guide vanes. Each of these fan exit guide vanes were structural elements that provided a load path between the fan case and the core engine.

In engine 100, as will be described below, there are fewer structural fan exit guide vanes 114. A-frames 116 have been added to provide additional rigidity.

As shown, the low pressure compressor 112 has five rotating stages. In embodiments the low pressure compressor may have four to six stages, which is longer than the first generation gas turbine engine manufactured by Applicant mentioned above. With such a long low pressure compressor 112, mounting challenges are raised.

Figure 2B:
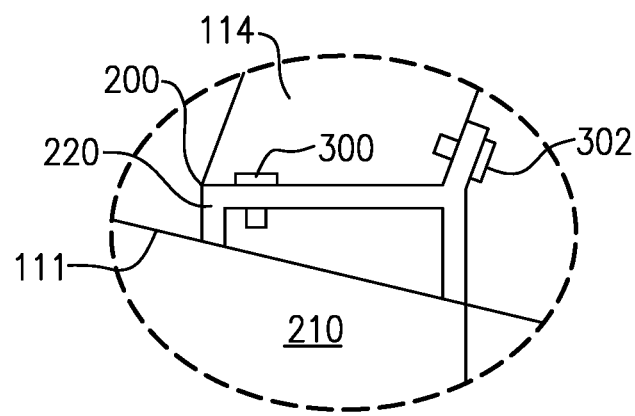
FIG. 2B shows another connection detail.

As can be seen from FIGS. 2A and 2B, the fan exit guide vanes 114/129 extend from an inner point 200 attached at an angle to a radially outer point 201, with the angle having a component in a radially outer direction, and another component in an axially aft direction.

Conversely, the A-frames 116 extend from a radially inner point 202 attached to the core engine 400, radially outwardly at an angle to an outer point 203 connected to the fan case 108. The angle of the A-frame 116 has a component in a radially outer direction and another component in an axially forward direction.

As shown in FIG. 2A, the core engine 400 includes a fan intermediate case 210 including a plurality of struts, and having a mount bracket 220. A non-structural guide vane 129 is attached to the bracket 220 through pins 222. In this manner, the non-structural guide vanes 129 can "float" or adjust radially relative to the bracket 220, but are prevented from moving circumferentially. Alternatively, the non-structural guide vanes may be fixed to bracket 220.

FIG. 2B shows a detail of the mount of a structural guide vane 114 to the fan intermediate case 210 and to the bracket 220 through a first pin 300 preventing circumferential movement, and a second pin 302 preventing radial movement.

Returning to FIG. 2A, it can be seen that the A-frames 116 are attached at inner ends 202 at a bracket 234 which is fixed with a compressor intermediate case 232 having a plurality of struts. This view illustrates one strut. The compressor intermediate cases 232 is intermediate the low pressure compressor 112 and a high pressure compressor 230.

Although specific mount locations are shown, other connections between the fan exit guide vanes 114/129 and A-frames 116 to the core engine 400 may be utilized. For purposes of this application, the core engine is defined to include at least the compressor housing wall 111, the fan intermediate case 210, the compressor intermediate case 232, the low pressure compressor 112, the high pressure compressor 230 and a combustor end turbine section, not shown, but which may be as disclosed with regard to FIG. 1.

Figure 3A:
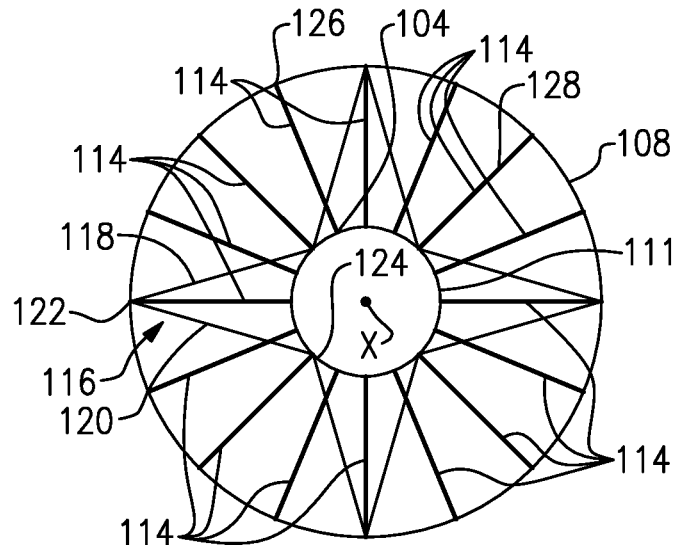
FIG. 3A shows a simplified rear view of FIG. 2.

As shown in FIG. 3A, the A-frames 116 comprise two rigid members 118 and 120 which extend from a connection point 122 at the fan case 108 inwardly to connection points 124 with the compressor housing 111. As can be seen, the members 118 extend away from each other moving away from the connection point 122, and in opposed directions/angles relative to a plane drawn through connection point 122, parallel to a center axis X. In FIG. 3A there are sixteen structural guide vanes 114 illustrated. Other numbers can be used. They are rigidly connected at 126 to the fan case 108, and at 128. It should be understood that FIG. 3A is an over simplification. In fact, as mentioned above, the fan exit guide vanes 114 and 129 and A-frames 116 may be attached as shown in FIGS. 2A and 2B. The view of FIG. 3A is shown simply to illustrate some general relationships. In embodiments, the engine 100 can have more or less than eight of the A-frame legs 118 and 120.

Figure 3B:
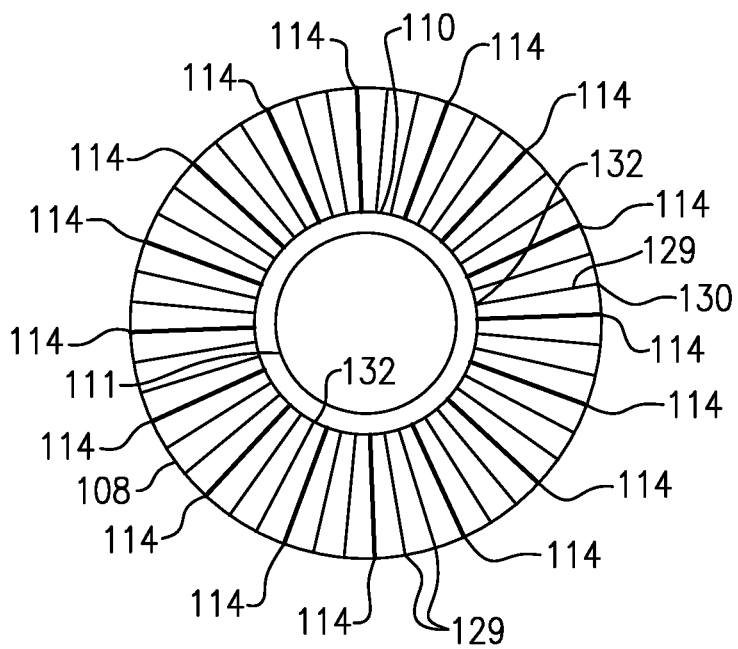
FIG. 3B shows a detail of a plurality of fan exit guide vanes.

As shown in FIG. 3B, there are forty-eight fan exit guide vanes total, with sixteen of the fan exit guide vanes being structural vanes 114. Intermediate each structural fan exit guide vane 114 are two non-structural guide vanes 129. The non-structural guide vanes 129 are rigidly connected to the fan case 108 at 130, but as mentioned may float relative to the wall 110 at a radially inner point 132. Alternatively, inner point 132 may be fixed.

Figure 3C:
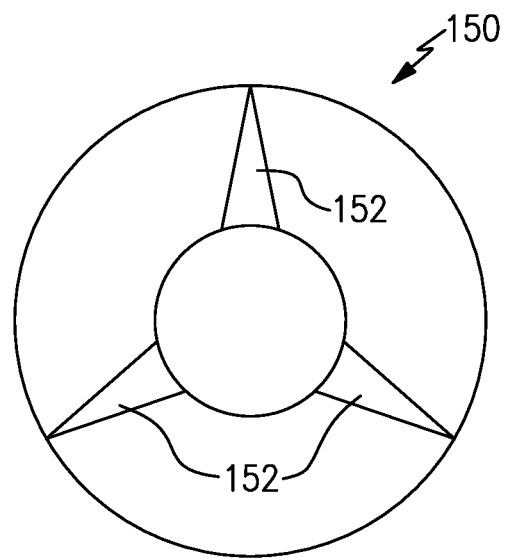
FIG. 3C shows another embodiment.

FIG. 3C schematically shows an embodiment 150 having three A-frames 152 connecting the fan case to the core engine.

Figure 3D:
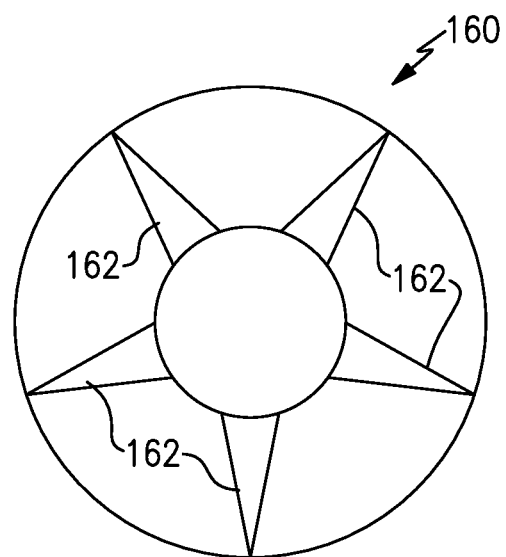
FIG. 3D shows another embodiment.

FIG. 3D shows an embodiment 160 having five A-frames 162 connecting the fan case to the core engine. As can appreciated, other numbers of A-frames may be utilized.

In fact, rigid connections other than A-frames may be utilized at this aft location. For purposes of interpreting this application, the A-frames along with the other types of rigid connections may be described generically as aft connecting numbers.

Figure 4:
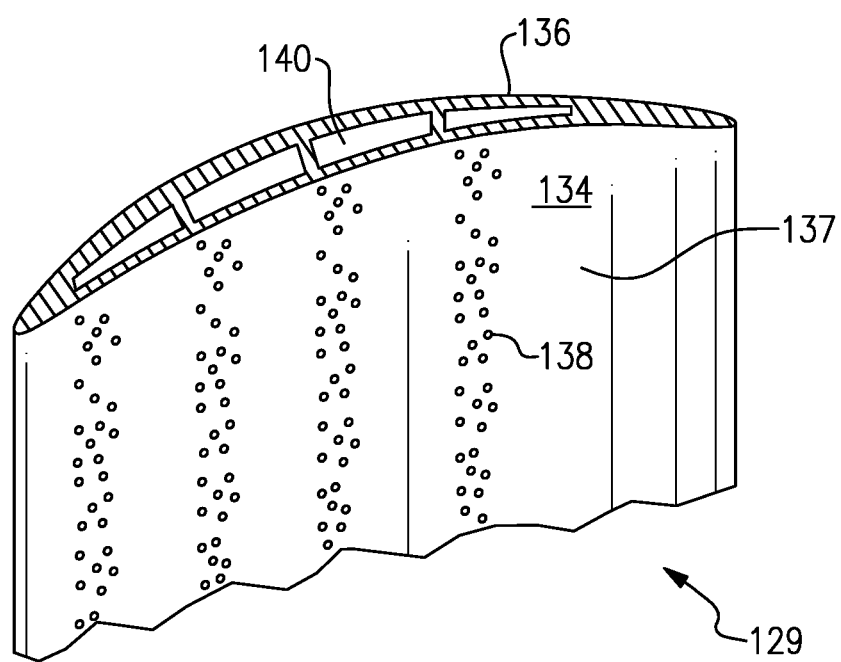
FIG. 4 shows details of one fan exit guide vane.

Since the guide vanes 129 are not structural, they can provide an acoustic function. As shown in FIG. 4, one of the non-structural fan exit guide vanes 129 is illustrated. The guide vane has a pressure wall 134 and a suction wall 136. An outer skin 137 is perforated at 138 and provided over a plurality of chambers 140. The chambers 140 can have any number of shapes including honeycomb, or other cross-sections. The perforations 138 could be circular, but can be other shapes, including elongated slots.

In embodiments the structural guide vanes 114 may include 0% to 55% of the total fan exit guide vanes. In other embodiments the structural fan exit guide vanes 114 may be 15 to 55% of the total fan exit guide vanes. In other embodiments the structural fan exit guide vanes 114 may include 15 to 50% of the total fan exit guide vanes. In yet another embodiment, the structural fan exit guide vanes provide 15 to 30% of the total fan exit guide vanes.

A gas turbine engine under this disclosure could be said to include a fan rotor driven by a fan drive turbine about an axis through a gear reduction to reduce a speed of the fan rotor relative to a speed of the fan drive turbine. A fan case surrounds the fan rotor, and a core engine has a compressor section, including a low pressure compressor. The fan rotor delivers air into a bypass duct defined between the fan case and the core engine. A rigid connection between the fan case and the core engine includes a plurality of aft connecting members rigidly connected to the fan case, and to the core engine. A plurality of fan exit guide vanes are rigidly connected to the fan case, with the fan exit guide vanes including structural fan exit guide vanes which are rigidly connected to the core engine, and non-structural fan exit guide vanes, and the non-structural fan exit guide vanes are provided with an acoustic feature to reduce noise.

A gas turbine engine under this disclosure could also be said to include a fan rotor driven by a fan drive turbine about an axis through a gear reduction to reduce a speed of the fan rotor relative to a speed of the fan drive turbine. A fan case surrounds the fan rotor. A core engine has a compressor section includes a low pressure compressor. The fan rotor delivers air into a bypass duct defined between the fan case and the core engine. A rigid connection between the fan case and inner core engine includes a plurality of A-frames each including a pair of legs rigidly connected at a connection point to the fan case. Each leg in the pair extending away from the connection point in opposed circumferential directions to be connected to the core engine to form an A-shape. A plurality of fan exit guide vanes are rigidly connected to the fan case, with the fan exit guide vanes including structural fan exit guide vanes which are rigidly connected to the core engine, and non-structural fan exit guide vanes, and the non-structural fan exit guide vanes are provided with an acoustic feature to reduce noise.

Although embodiments of this disclosure have been shown, a worker of ordinary skill in this art would recognize that modifications would come within the scope of this disclosure. For that reason, the following claims should be studied to determine the true scope and content of this disclosure.

What is claimed is:

1. A gas turbine engine comprising:
   a fan rotor driven by a fan drive turbine about an axis through a gear reduction to reduce a speed of said fan rotor relative to a speed of said fan drive turbine;
   a fan case surrounding said fan rotor, and a core engine with a compressor section, including a low pressure compressor, said low pressure compressor having four to six stages;
   said fan rotor delivering air into a bypass duct defined between said fan case and said core engine, and a rigid connection between said fan case and said core engine including a plurality of aft connecting members rigidly connected to said fan case, and to said core engine at a location downstream of said low pressure compressor;
   a plurality of fan exit guide vanes rigidly connected to said fan case, with said plurality of fan exit guide vanes including structural fan exit guide vanes which are rigidly connected to said core engine and non-structural fan exit guide vanes; and
   said structural fan exit guide vanes include more than 0% and less than or equal to 55% of the plurality of fan exit guide vanes including the non-structural fan exit guide vane.

2. The gas turbine engine as set forth in claim 1, wherein said non-structural fan exit guide vanes include an acoustic feature.

3. The gas turbine engine as set forth in claim 1, wherein at least one non-structural fan exit guide vane of the non-structural fan exit guide vanes is formed with chambers configured to reduce noise associated with the gas turbine engine.

4. The gas turbine engine as set forth in claim 3, wherein at least one non-structural fan exit guide vane of the non-structural fan exit guide vanes includes a covering comprising a perforated face sheet.

5. The gas turbine engine as set forth in claim 1, wherein at least one non-structural fan exit guide vane of the non-structural fan exit guide vanes includes a covering comprising a perforated face sheet.

6. The gas turbine engine as set forth in claim 1, wherein said structural fan exit guide vanes include 15-30% of the plurality of fan exit guide vanes.

7. The gas turbine engine as set forth in claim 1, wherein said aft connecting members are A-frames connecting said fan case to said core engine.

8. The gas turbine engine as set forth in claim 7, wherein said structural fan exit guide vanes extend at a first angle from a radially inner end to a radially outer end, and said first angle having a radially outward component and an axially aft component, and said A-frame legs extending from a radially inner connection to said core engine to a connection point with said fan case at a second angle having a component in a radially outward direction, and in an axially forward direction.

9. The gas turbine engine as set forth in claim 1, wherein said core engine includes a fan intermediate case forward of said low pressure compressor, and said structural fan guide vanes are rigidly connected to said fan intermediate case.

10. The gas turbine engine as set forth in claim 1, wherein said core engine including a compressor intermediate case intermediate said low pressure compressor and a high pressure compressor, and said aft connecting members rigidly secured to said compressor intermediate case.

11. The gas turbine engine as set forth in claim 1, wherein a bypass ratio defined as the volume of air delivered by the fan rotor into the bypass duct divided by the volume of air delivered by the fan rotor into the core engine, and said bypass ratio being greater than or equal to 10.0 and less than or equal to 18.0.

12. The gas turbine engine as set forth in claim 1, wherein the fan rotor having a fan hub with fan blades extending radially outwardly of the fan hub, and there being a hub radius defined as a distance between the fan hub at a location of a leading edge of the fan blade and an engine rotational axis, and there being a fan hub to fan blade tip ratio defined as the ratio of the hub radius divided by a maximum radius of the fan, and the fan hub to fan blade tip ratio being greater than or equal 0.20 and less than or equal to 0.35.

13. A gas turbine engine comprising:
   a fan rotor driven by a fan drive turbine about an axis through a gear reduction to reduce a speed of said fan rotor relative to a speed of said fan drive turbine;
   a fan case surrounding said fan rotor, and a core engine with a compressor section, including a low pressure compressor;
   said fan rotor delivering air into a bypass duct defined between said fan case and said core engine, and a rigid connection between said fan case and core engine including a plurality of A-frames each including a pair of legs rigidly connected at a connection point to said fan case, and each leg in said pair extending away from said connection point in opposed circumferential directions to be connected to said core engine to form an A-shape; and
   a plurality of fan exit guide vanes rigidly connected to said fan case, with said plurality of fan exit guide vanes including structural fan exit guide vanes which are rigidly connected to said core engine, and non-structural fan exit guide vanes, and said non-structural fan exit guide vanes being provided with an acoustic feature to reduce noise, said acoustic feature including said non-structural fan exit guide vanes being formed with chambers and a covering perforated face sheet.

14. The gas turbine engine as set forth in claim 13, wherein the plurality of A-frames includes between three and five A-frames connecting said fan case to said core engine.

15. The gas turbine engine as set forth in claim 13, wherein said structural fan exit guide vanes extend at a first angle from a radially inner end to a radially outer end, and said first angle having a radially outward component and an axially aft component, and said A-frame legs extending from a radially inner connection to said core engine to said connection point with said fan case at a second angle having a component in a radially outward direction, and in an axially forward direction.

16. The gas turbine engine as set forth in claim 13, wherein said core engine includes a fan intermediate case forward of said low pressure compressor, and at least one structural fan guide vane of said structural fan guide vanes is rigidly connected to said fan intermediate case.

17. The gas turbine engine as set forth in claim 13, wherein said core engine including a compressor intermediate case intermediate said low pressure compressor and a high pressure compressor, and at least one A-frame of said plurality of A-frames being rigidly secured to said compressor intermediate housing.

18. The gas turbine engine as set forth in claim 13, wherein a bypass ratio defined as the volume of air delivered by the fan rotor into the bypass duct divided by the volume of air delivered by the fan rotor into the core engine, and said bypass ratio being greater than or equal to 10.0 and less than or equal to 18.0.

19. The gas turbine engine as set forth in claim 13, wherein the fan rotor having a fan hub with fan blades extending radially outwardly of the fan hub, and there being a hub radius defined as a distance between the fan hub at a location of a leading edge of the fan blade and an engine rotational axis, and there being a fan hub to fan blade tip ratio defined as the ratio of the hub radius divided by a maximum radius of the fan, and the fan hub to fan blade tip ratio being greater than or equal 0.20 and less than or equal to 0.35.

20. The gas turbine engine as set forth in claim 13, wherein said low pressure compressor has four to six stages.

* * * * *